United States Patent
Li (10) Patent No.: US 10,528,310 B2
(45) Date of Patent: Jan. 7, 2020

(54) CONTENT DISPLAYING METHOD AND ELECTRONIC DEVICE

(71) Applicant: Lenovo (Beijing) Co., Ltd., Beijing (CN)

(72) Inventor: Fanzhi Li, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 15/631,062

(22) Filed: Jun. 23, 2017

(65) Prior Publication Data

US 2017/0371610 A1    Dec. 28, 2017

(30) Foreign Application Priority Data

Jun. 28, 2016   (CN) .......................... 2016 1 0491174

(51) Int. Cl.
```
G06F 3/14      (2006.01)
H04M 1/725     (2006.01)
H04W 4/80      (2018.01)
H04W 4/70      (2018.01)
H04W 12/06     (2009.01)
H04W 76/10     (2018.01)
G09G 3/00      (2006.01)
H04W 12/04     (2009.01)
```
(52) U.S. Cl.
CPC .............. *G06F 3/14* (2013.01); *G06F 3/1454* (2013.01); *G09G 3/003* (2013.01); *H04M 1/7253* (2013.01); *H04M 1/72527* (2013.01); *H04M 1/72569* (2013.01); *H04W 4/70* (2018.02); *H04W 4/80* (2018.02); *H04W 12/04* (2013.01); *H04W 12/06* (2013.01); *H04W 76/10* (2018.02); *G09G 2370/16* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2002/0089518 A1* | 7/2002 | Shigeta | G06F 3/14 345/629 |
| 2016/0035312 A1* | 2/2016 | Lee | H04M 1/7253 717/174 |
| 2018/0164589 A1* | 6/2018 | Watanabe | G06F 3/0481 |

FOREIGN PATENT DOCUMENTS

| CN | 103383634 A | 11/2013 |
|---|---|---|
| CN | 104204994 A | 12/2014 |
| CN | 104346120 A | 2/2015 |
| CN | 104516696 A | 4/2015 |
| CN | 104731541 A | 6/2015 |

* cited by examiner

*Primary Examiner* — Yingchun He
(74) *Attorney, Agent, or Firm* — Anova Law Group, PLLC (57) ABSTRACT

A method includes detecting, using one or more processors, whether a coordinated electronic device is within a preset area around a coordinating electronic device, pairing the coordinating electronic device with the coordinated electronic device in response to detecting that the coordinated electronic device is within the preset area, negotiating with the coordinated electronic device to determine a display parameter of the coordinating electronic device in response to successfully pairing the coordinating electronic device and the coordinated electronic device, and displaying a target content according to the display parameter.

16 Claims, 7 Drawing Sheets

CONTENT DISPLAYING METHOD AND ELECTRONIC DEVICE

CROSS-REFERENCE TO RELATED APPLICATION

This application claims priority to Chinese Patent Application No. 201610491174.1, filed on Jun. 28, 2016, the entire contents of which are incorporated herein by reference.

TECHNICAL FIELD

The present disclosure relates to the information display technology and, more particularly, to a method and electronic device for displaying information.

BACKGROUND TECHNOLOGIES

Augmented reality (AR) refers to a technology that combines virtual information or object into a real scene, to allow a user to interact with a real or virtual object/scene. With vehicles being more intelligentized, the AR technology has been used in the head-up display (HUD) installed in the vehicles. Through the HUD, the user can see virtual information superimposed on the real scene outside the windshield. The virtual information can include prompting information, such as weather, time, and/or road condition. In addition, the user sometimes may wear another electronic device implementing the AR technology, such as smart glasses implementing the AR technology, which allows the user to see virtual information superimposed on the real scene through the electronic device. Thus, when the user drives a vehicle equipped with an HUD while wearing smart glasses, the information displayed on the HUD and the information displayed on the smart glasses may interfere with each other, impacting the user experience.

SUMMARY

In accordance with the disclosure, there is provided a method including detecting, using one or more processors, whether a coordinated electronic device is within a preset area around a coordinating electronic device, pairing the coordinating electronic device with the coordinated electronic device in response to detecting that the coordinated electronic device is within the preset area, negotiating with the coordinated electronic device to determine a display parameter of the coordinating electronic device in response to successfully pairing the coordinating electronic device and the coordinated electronic device, and displaying a target content according to the display parameter.

Also in accordance with the disclosure, there is provided an electronic device comprising a processor, a memory coupled to the processor, and a display device coupled to the processor. The memory stores instructions to be executed by the processor to detect whether a coordinated electronic device is within a preset area around the electronic device, pair the electronic device with the coordinated electronic device in response to detecting that the coordinated electronic device is within the preset area, and negotiate with the coordinated electronic device to determine a display parameter of the electronic device in response to successfully pairing the electronic device and the coordinated electronic device. The display device displays a target content according to the display parameter.

DESCRIPTION OF EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

Embodiments consistent with the disclosure include methods and devices for processing and displaying information. A method or device according to the disclosure can be implemented in an electronic apparatus having an information processing and displaying function, such as an augmented reality (AR) device. For example, methods consistent with the disclosure can be directed to coordinating the displaying of information by a first electronic device and a second electronic device, and can be implemented in, e.g., the first electronic device. The first electronic device can also be referred to as a "coordinating electronic device," and the second electronic device can also be referred to as a "coordinated electronic device."

Figure 1:
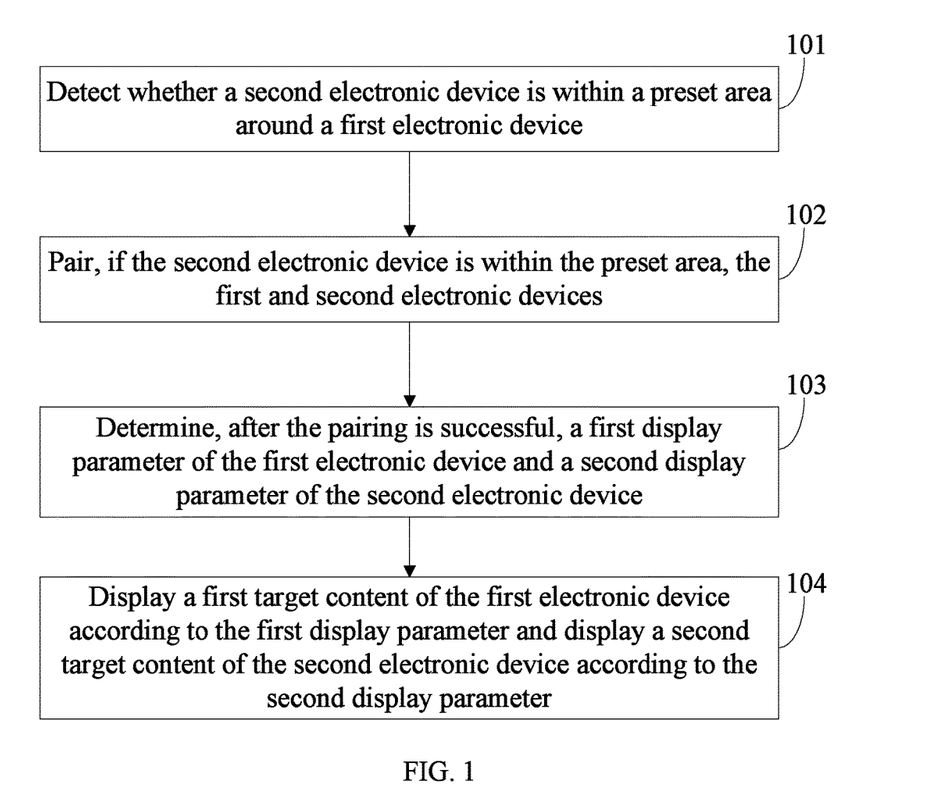
FIG. 1 is a flow chart of an example of an information displaying method consistent with embodiments of the disclosure.

FIG. 1 is a flow chart of an example of an information displaying method consistent with embodiments of the disclosure. As shown in FIG. 1, at 101, it is detected whether the second electronic device is within a preset area around the first electronic device.

In some embodiments, the first and second electronic devices can both be AR devices. In some embodiments, an AR device can include a projector, which can project light emitted by a light source to an eye of a user through a lens or a lens set, such that the user can see virtual information. The virtual information can be superimposed on a real scene, and thus the user can see a picture with the virtual information embedded in the real scene. Such an AR device can include, for example, smart glasses. In some other embodiments, an AR device can include a transparent screen, which can display the virtual information. The user can also see the real scene through the transparent screen. Thus, the user can also see a picture with the virtual information embedded in the real scene. Such an AR device can include, for example, a head-up display (HUD).

In some embodiments, a virtual image displayed by the first electronic device is also referred to as a "first target content" and a virtual image displayed by the second electronic device is also referred to as a "second target content." Sometimes, a display area of the first target content and a display area of the second target content may partially or completely overlap each other. In this situation, the user will see a superimposed view of the first target content and the second target content. The first target content may block the display of the second target content, or the second target content may block the display of the first target content. Therefore, the display of the first target content and the display of the second target content may need to be coordinated.

In some embodiments, the first electronic device may include a short-range communication module and the second electronic may also include a short-range communication module of a same type. The short-range communication module may include an electrical circuit configured to communicate with another device, and can be, for example, a Blue-Tooth (BT) module. Whether the second electronic device is within the preset area around the first electronic device can be determine using one or both of the short-range communication modules of the first and second electronic devices.

At 102, if the second electronic device is within the preset area around the first electronic device, the first and second electronic devices are paired with each other. That is, when the second electronic device is within the preset area around the first electronic device, it indicates that the display of the second target content of the second electronic device may overlap the display of the first target content of the first electronic device. In this situation, a pairing process may need to be initiated. Specifically, both the first and second electronic devices can turn on the short-range communication module. The first electronic device can search for the second electronic device in the nearby area. When finding the second electronic device, the first electronic device can send a pairing request to the second electronic device. When the second electronic device responds to the pairing request, the first and second electronic devices can be paired successfully. In some embodiments, the first and second electronic devices can negotiate a common identification code during the pairing process. When both electronic devices acquire the common identification code, the pairing is successful.

At 103, after the pairing is successful, a first display parameter of the first electronic device and a second display parameter of the second electronic device are determined. In some embodiments, when the pairing is successful, the first electronic device and the second electronic device negotiate respective display parameters. The negotiated display parameter of the first electronic device can be determined as the first display parameter, and the negotiated display parameter of the second electronic device can be determined as the second display parameter.

In some embodiments, a display parameter can include at least a display position parameter indicating a display area of a target content. The display parameter can further include, for example, a display effect parameter and/or a scaling parameter.

In some embodiments, the first electronic device can obtain both the first display parameter of the first electronic device and the second display parameter of the second electronic device. In some embodiments, the second electronic device can obtain both the second display parameter of the second electronic device and the first display parameter of the first electronic device. In the embodiments that the second electronic device obtains both the first and second display parameters, the first electronic device can receive the first display parameter from the second electronic device. In some other embodiments, the first electronic device may only obtain the first display parameter and the second electronic device may only obtain the second display parameter.

At 104, the first target content of the first electronic device is displayed according to the first display parameter, and the second target content of the second electronic device is displayed according to the second display parameter. The first target content and the second target content are displayed without covering each other.

In some embodiments, the first electronic device can display the first target content in a first area, also referred to as "first display area." In some embodiments, the first electronic device can display the first target content in the first area according to preset display effect parameter and/or scaling parameter.

In some embodiments, the second electronic device can display the second target content in a second area, also referred to as a "second display area." In some embodiments, the second electronic device can display the second target content in the second area according to preset display effect parameter and/or scaling parameter.

Figure 5:
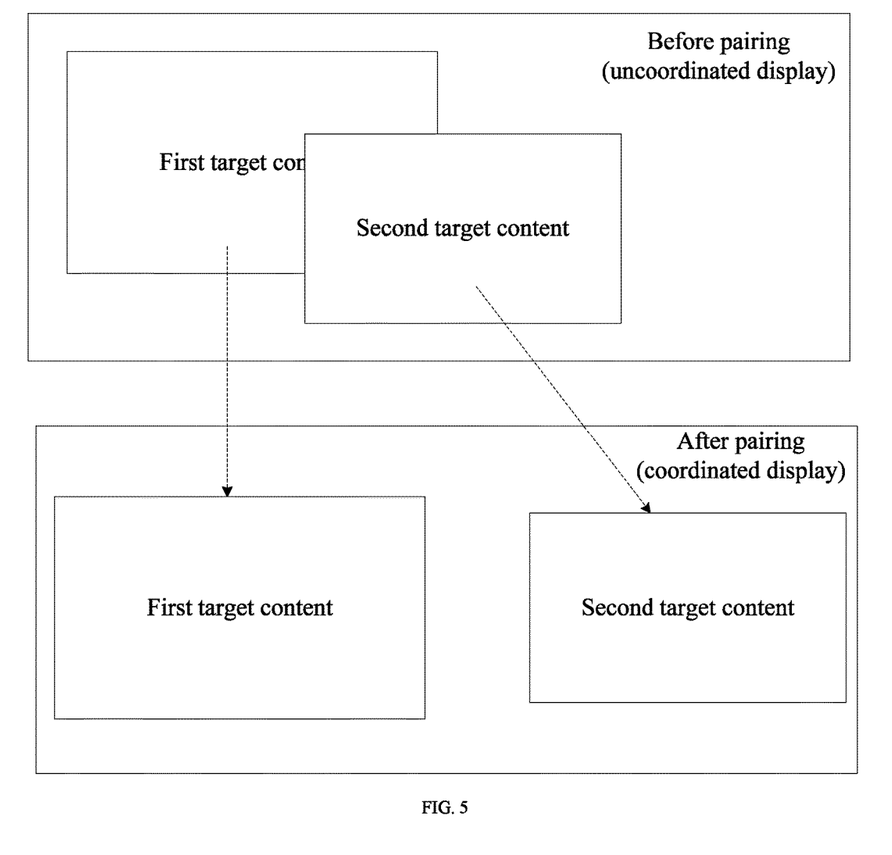
FIG. 5 schematically shows display areas consistent with embodiments of the disclosure.

As shown in FIG. 5, the first area and the second area do not overlap each other. Thus, the displayed first target content and the displayed second target content do not cover each other, and the user can see the first target content and the second target content without them affecting each other.

Figure 2:
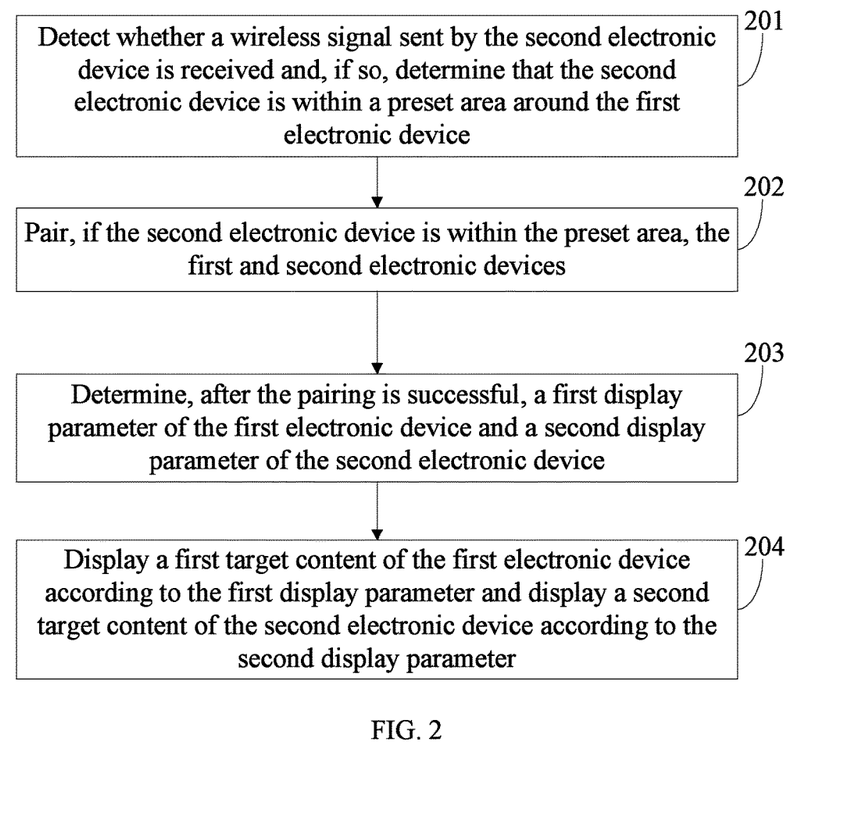
FIG. 2 is a diagram showing another example of an information displaying method consistent with embodiments of the disclosure.

FIG. 2 is a flow chart of another example of an information displaying method consistent with the disclosure. As shown in FIG. 2, at 201, it is detected whether a wireless signal sent by the second electronic device is received. When the wireless signal sent by the second electronic device is received, it is determined that the second electronic device is within a preset area around the first electronic device.

In some embodiments, the first and second electronic devices can both be AR devices. In some embodiments, an AR device can include a projector, which can project light emitted by a light source to an eye of a user through a lens or a lens set, such that the user can see virtual information. The virtual information can be superimposed on a real scene, and thus the user can see a picture with the virtual information embedded in the real scene. Such an AR device can include, for example, smart glasses. In some other embodiments, an AR device can include a transparent screen, which can display the virtual information. The user can also see the real scene through the transparent screen. Thus, the user can also see a picture with the virtual information embedded in the real scene. Such an AR device can include, for example, a head-up display (HUD).

In some embodiments, a virtual image displayed by the first electronic device is also referred to as a "first target content" and a virtual image displayed by the second electronic device is also referred to as a "second target content." Sometimes, a display area of the first target content and a display area of the second target content may partially or completely overlap each other. In this situation, the user will see a superimposed view of the first target content and the second target content. The first target content may block the display of the second target content, or the second target content may block the display of the first target content.

Therefore, the display of the first target content and the display of the second target content may need to be coordinated.

In some embodiments, the first electronic device may include a short-range communication module and the second electronic may also include a short-range communication module of a same type. The short-range communication module may include an electrical circuit configured to communicate with another device, and can be, for example, a Blue-Tooth (BT) module. Whether the second electronic device is within the preset area around the first electronic device can be determine using one or both of the short-range communication modules of the first and second electronic devices. Specifically, both the first and second electronic devices can turn on the short-range communication module. The first electronic device can search for the second electronic device in the nearby area. When the first electronic device finds the second electronic device, it can be determined that the second electronic device is within the preset area of the first electronic device.

At 202, if the second electronic device is within the preset area around the first electronic device, the first and second electronic devices are paired with each other. That is, when the second electronic device is within the preset area around the first electronic device, it indicates that the display of the second target content of the second electronic device may overlap the display of the first target content of the first electronic device. In this situation, a pairing process may need to be initiated. When finding the second electronic device, the first electronic device can send a pairing request to the second electronic device. When the second electronic device responds to the pairing request, the first and second electronic devices can be paired successfully. In some embodiments, the first and second electronic devices can negotiate a common identification code during the pairing process. When both electronic devices acquire the common identification code, the pairing is successful.

At 203, after the pairing is successful, a first display parameter of the first electronic device and a second display parameter of the second electronic device are determined. In some embodiments, when the pairing is successful, the first electronic device and the second electronic device negotiate respective display parameters. The negotiated display parameter of the first electronic device can be determined as the first display parameter, and the negotiated display parameter of the second electronic device can be determined as the second display parameter.

In some embodiments, a display parameter can include at least a display position parameter indicating a display area of a target content. The display parameter can further include, for example, a display effect parameter and/or a scaling parameter.

In some embodiments, the first electronic device can obtain both the first display parameter of the first electronic device and the second display parameter of the second electronic device. In some embodiments, the second electronic device can obtain both the second display parameter of the second electronic device and the first display parameter of the first electronic device. In some other embodiments, the first electronic device may only obtain the first display parameter and the second electronic device may only obtain the second display parameter.

At 204, the first target content of the first electronic device is displayed according to the first display parameter, and the second target content of the second electronic device is displayed according to the second display parameter. The first target content and the second target content are displayed without covering each other.

In some embodiments, the first electronic device can display the first target content in a first area. In some embodiments, the first electronic device can display the first target content in the first area according to preset display effect parameter and/or scaling parameter.

In some embodiments, the second electronic device can display the second target content in a second area. In some embodiments, the second electronic device can display the second target content in the second area according to preset display effect parameter and/or scaling parameter.

As shown in FIG. 5, the first area and the second area do not overlap each other. Thus, the displayed first target content and the displayed second target content do not cover each other, and the user can see the first target content and the second target content without they affecting each other.

Figure 3:
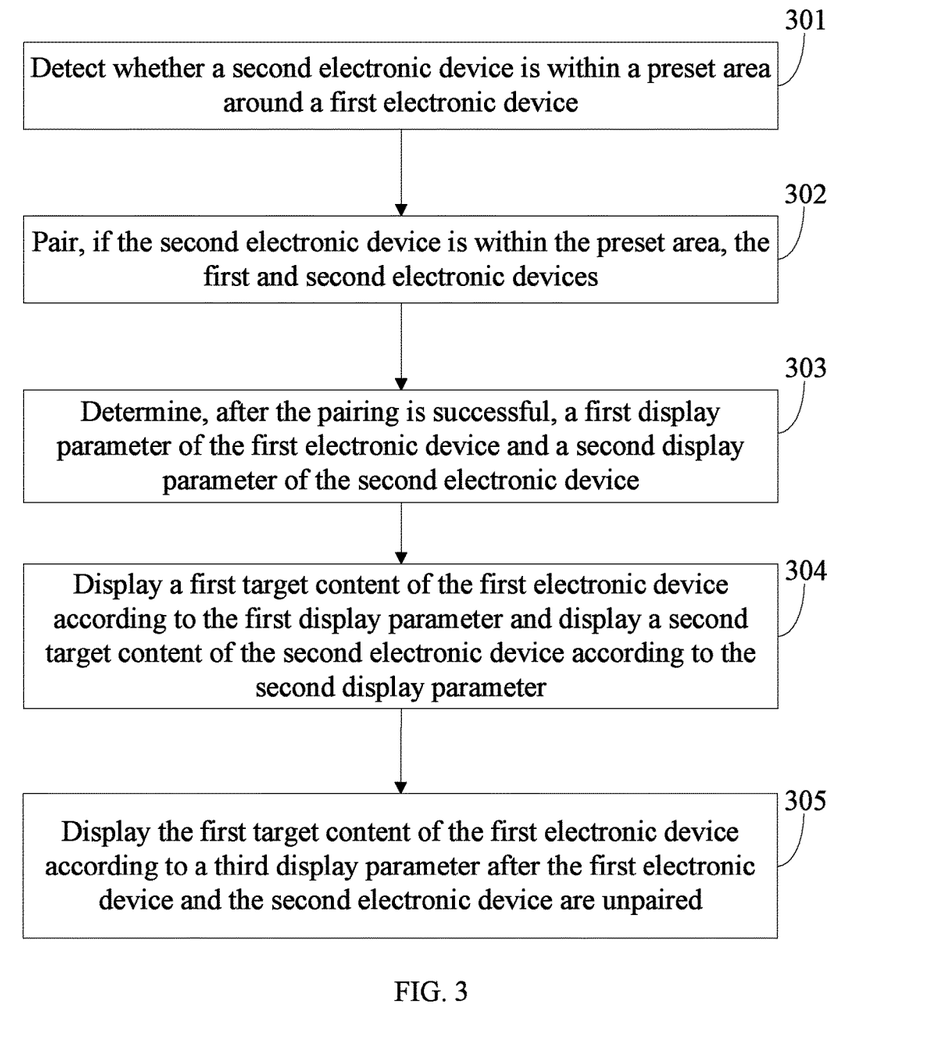
FIG. 3 is a diagram showing another example of an information displaying method consistent with embodiments of the disclosure.

FIG. 3 is a flow chart of another example of an information displaying method consistent with embodiments of the disclosure. As shown in FIG. 3, at 301, it is detected whether the second electronic device is within a preset area around the first electronic device.

In some embodiments, the first and second electronic devices can both be AR devices. In some embodiments, an AR device can include a projector, which can project light emitted by a light source to an eye of a user through a lens or a lens set, such that the user can see virtual information. The virtual information can be superimposed on a real scene, and thus the user can see a picture with the virtual information embedded in the real scene. Such an AR device can include, for example, smart glasses. In some other embodiments, an AR device can include a transparent screen, which can display the virtual information. The user can also see the real scene through the transparent screen. Thus, the user can also see a picture with the virtual information embedded in the real scene. Such an AR device can include, for example, a head-up display (HUD).

In some embodiments, a virtual image displayed by the first electronic device is also referred to as a "first target content" and a virtual image displayed by the second electronic device is also referred to as a "second target content." Sometimes, a display area of the first target content and a display area of the second target content may partially or completely overlap each other. In this situation, the user will see a superimposed view of the first target content and the second target content. The first target content may block the display of the second target content, or the second target content may block the display of the first target content. Therefore, the display of the first target content and the display of the second target content may need to be coordinated.

In some embodiments, the first electronic device may include a short-range communication module and the second electronic may also include a short-range communication module of a same type. The short-range communication module may include an electrical circuit configured to communicate with another device, and can be, for example, a Blue-Tooth (BT) module. Whether the second electronic device is within the preset area around the first electronic device can be determine using one or both of the short-range communication modules of the first and second electronic devices.

At 302, if the second electronic device is within the preset area around the first electronic device, the first and second electronic devices are paired with each other. That is, when the second electronic device is within the preset area around the first electronic device, it indicates that the display of the second target content of the second electronic device may overlap the display of the first target content of the first electronic device. In this situation, a pairing process may need to be initiated. Specifically, both the first and second electronic devices can turn on the short-range communication module. The first electronic device can search for the second electronic device in the nearby area. When finding the second electronic device, the first electronic device can send a pairing request to the second electronic device. When the second electronic device responds to the pairing request, the first and second electronic devices can be paired successfully. In some embodiments, the first and second electronic devices can negotiate a common identification code during the pairing process. When both electronic devices acquire the common identification code, the pairing is successful.

At 303, after the pairing is successful, a first display parameter of the first electronic device and a second display parameter of the second electronic device are determined. In some embodiments, when the pairing is successful, the first electronic device and the second electronic device negotiate respective display parameters. The negotiated display parameter of the first electronic device can be determined as the first display parameter, and the negotiated display parameter of the second electronic device can be determined as the second display parameter.

In some embodiments, a display parameter can include at least a display position parameter indicating a display area of a target content. The display parameter can further include, for example, a display effect parameter and/or a scaling parameter.

In some embodiments, the first electronic device can obtain both the first display parameter of the first electronic device and the second display parameter of the second electronic device. In some embodiments, the second electronic device can obtain both the second display parameter of the second electronic device and the first display parameter of the first electronic device. In some other embodiments, the first electronic device may only obtain the first display parameter and the second electronic device may only obtain the second display parameter.

At 304, the first target content of the first electronic device is displayed according to the first display parameter, and the second target content of the second electronic device is displayed according to the second display parameter. The first target content and the second target content are displayed without covering each other.

In some embodiments, the first electronic device can display the first target content in a first area. In some embodiments, the first electronic device can display the first target content in the first area according to preset display effect parameter and/or scaling parameter.

In some embodiments, the second electronic device can display the second target content in a second area. In some embodiments, the second electronic device can display the second target content in the second area according to preset display effect parameter and/or scaling parameter.

As shown in FIG. 5, the first area and the second area do not overlap each other. Thus, the displayed first target content and the displayed second target content do not cover each other, and the user can see the first target content and the second target content without they affecting each other.

Referring again to FIG. 3, at 305, after the first electronic device and the second electronic device are unpaired, the first target content of the first electronic device is displayed according to a third display parameter. In some embodiments, the first and second electronic devices can be unpaired in response to a manual operation. In some embodiments, the first and second electronic devices can be unpaired when the second electronic device moves out of the preset area of the first electronic device.

After the first and second electronic devices are unpaired, the first and second devices can display their respective contents according to their original display modes. That is, the first electronic device can display the first target content of the first electronic device according to the third display parameter, and the second electronic device can display the second target content of the second electronic device according to a fourth display parameter. In some embodiments, the third display parameter and the fourth display parameter are original display parameters of the first and second electronic devices, respectively, before the first and second electronic devices are paired.

Figure 4:
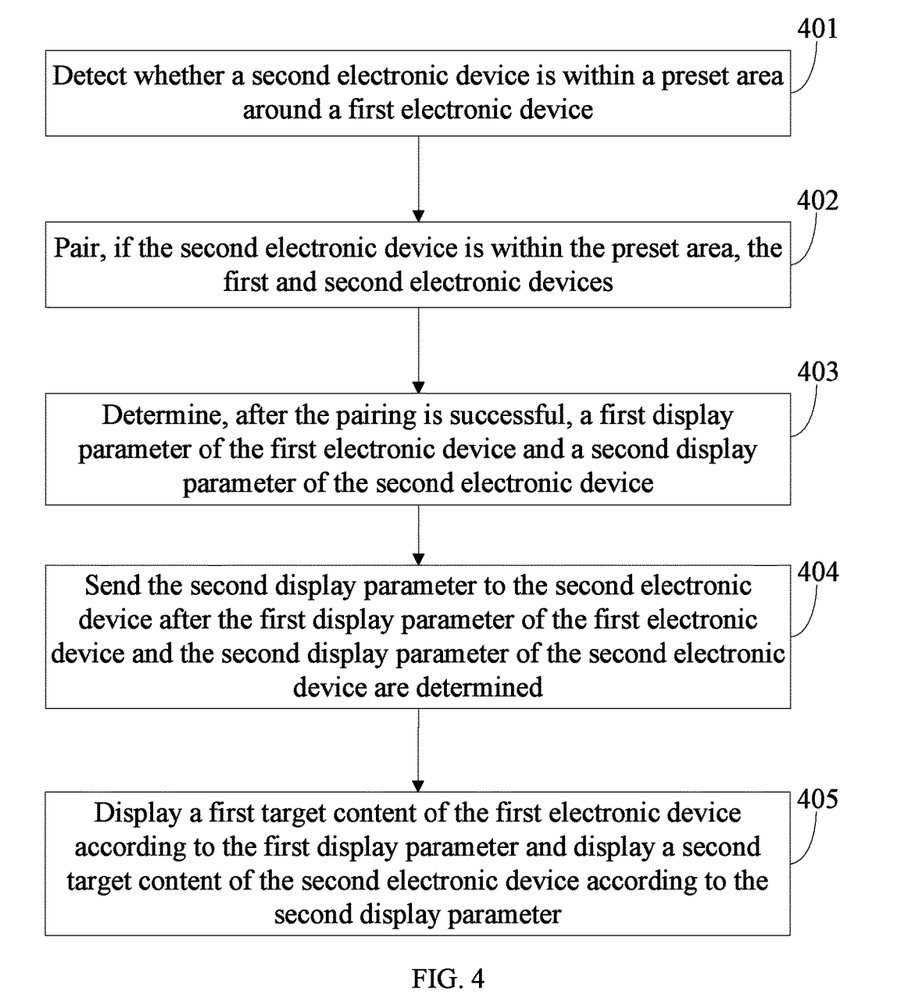
FIG. 4 is a diagram showing another example of an information displaying method consistent with embodiments of the disclosure.

FIG. 4 is a flow chart of another example of an information displaying method consistent with embodiments of the disclosure. As shown in FIG. 4, at 401, it is detected whether the second electronic device is within a preset area around the first electronic device.

In some embodiments, the first and second electronic devices can both be AR devices. In some embodiments, an AR device can include a projector, which can project light emitted by a light source to an eye of a user through a lens or a lens set, such that the user can see virtual information. The virtual information can be superimposed on a real scene, and thus the user can see a picture with the virtual information embedded in the real scene. Such an AR device can include, for example, smart glasses. In some other embodiments, an AR device can include a transparent screen, which can display the virtual information. The user can also see the real scene through the transparent screen. Thus, the user can also see a picture with the virtual information embedded in the real scene. Such an AR device can include, for example, a head-up display (HUD).

In some embodiments, a virtual image displayed by the first electronic device is also referred to as a "first target content" and a virtual image displayed by the second electronic device is also referred to as a "second target content." Sometimes, a display area of the first target content and a display area of the second target content may partially or completely overlap each other. In this situation, the user will see a superimposed view of the first target content and the second target content. The first target content may block the display of the second target content, or the second target content may block the display of the first target content. Therefore, the display of the first target content and the display of the second target content may need to be coordinated.

In some embodiments, the first electronic device may include a short-range communication module and the second electronic may also include a short-range communication module of a same type. The short-range communication module may include an electrical circuit configured to communicate with another device, and can be, for example, a Blue-Tooth (BT) module. Whether the second electronic device is within the preset area around the first electronic device can be determine using one or both of the short-range communication modules of the first and second electronic devices.

At 402, if the second electronic device is within the preset area around the first electronic device, the first and second electronic devices are paired with each other. That is, when the second electronic device is within the preset area around the first electronic device, it indicates that the display of the second target content of the second electronic device may overlap the display of the first target content of the first electronic device. In this situation, a pairing process may need to be initiated. Specifically, both the first and second electronic devices can turn on the short-range communication module. The first electronic device can search for the second electronic device in the nearby area. When finding the second electronic device, the first electronic device can send a pairing request to the second electronic device. When the second electronic device responds to the pairing request, the first and second electronic devices can be paired successfully. In some embodiments, the first and second electronic devices can negotiate a common identification code during the pairing process. When both electronic devices acquire the common identification code, the pairing is successful.

At 403, after the pairing is successful, a first display parameter of the first electronic device and a second display parameter of the second electronic device are determined. In some embodiments, when the pairing is successful, the first electronic device and the second electronic device negotiate respective display parameters. The negotiated display parameter of the first electronic device can be determined as the first display parameter, and the negotiated display parameter of the second electronic device can be determined as the second display parameter.

In some embodiments, a display parameter can include at least a display position parameter indicating a display area of a target content. The display parameter can further include, for example, a display effect parameter and/or a scaling parameter.

In some embodiments, the first electronic device can obtain both the first display parameter of the first electronic device and the second display parameter of the second electronic device.

At 404, after the first display parameter of the first electronic device and the second display parameter of the second electronic device are determined, the first electronic device sends the second display parameter to the second electronic device. That is, since the first electronic device obtains both the first display parameter of the first electronic device and the second display parameter of the second electronic device, the first electronic device can send the second display parameter to the second electronic device.

At 404, the first target content of the first electronic device is displayed according to the first display parameter, and the second target content of the second electronic device is displayed according to the second display parameter. The first target content and the second target content are displayed without covering each other.

In some embodiments, the first electronic device can display the first target content in a first area. In some embodiments, the first electronic device can display the first target content in the first area according to preset display effect parameter and/or scaling parameter.

In some embodiments, the second electronic device can display the second target content in a second area. In some embodiments, the second electronic device can display the second target content in the second area according to preset display effect parameter and/or scaling parameter.

As shown in FIG. 5, the first area and the second area do not overlap each other. Thus, the displayed first target content and the displayed second target content do not cover each other, and the user can see the first target content and the second target content without they affecting each other.

Figure 6:
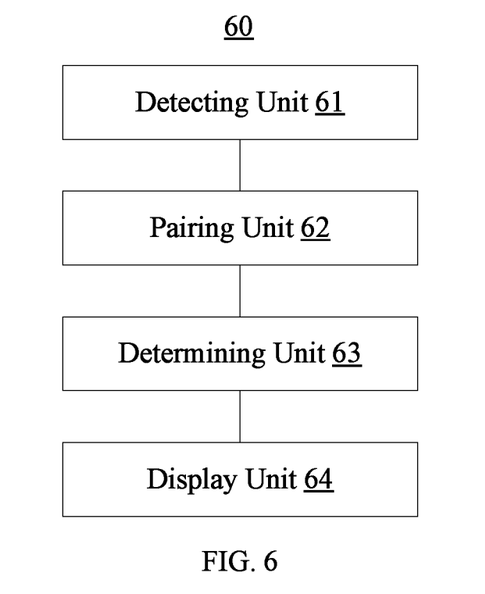
FIG. 6 is a structural diagram of an example of an information displaying device consistent with embodiments of the disclosure.

FIG. 6 is a structural diagram of an example of an electronic device 60 consistent with embodiments of the disclosure. The electronic device 60 can be an example of the first electronic device described above. As shown in FIG. 6, the electronic device 60 includes a detecting unit 61, a pairing unit 62, a determining unit 63, and a display unit 64. The detecting unit 61 detects whether the second electronic device is within a preset area around the electronic device 60. The pairing unit 62 pairs the electronic device 60 with the second electronic device if the second electronic device is within the preset area of the electronic device 60. The determining unit 63 determines a first display parameter of the electronic device 60 and a second display parameter of the second electronic device. The display unit 64 displays a first target content of the electronic device 60 according to the first display parameter. Further, the second electronic device can display the second target content of the second electronic device according to the second display parameter. The displayed first and second target contents do not cover each other. The functions of various units of the electronic device 60 are similar to the examples of information displaying method described above, and thus detailed description thereof is omitted.

Figure 7:
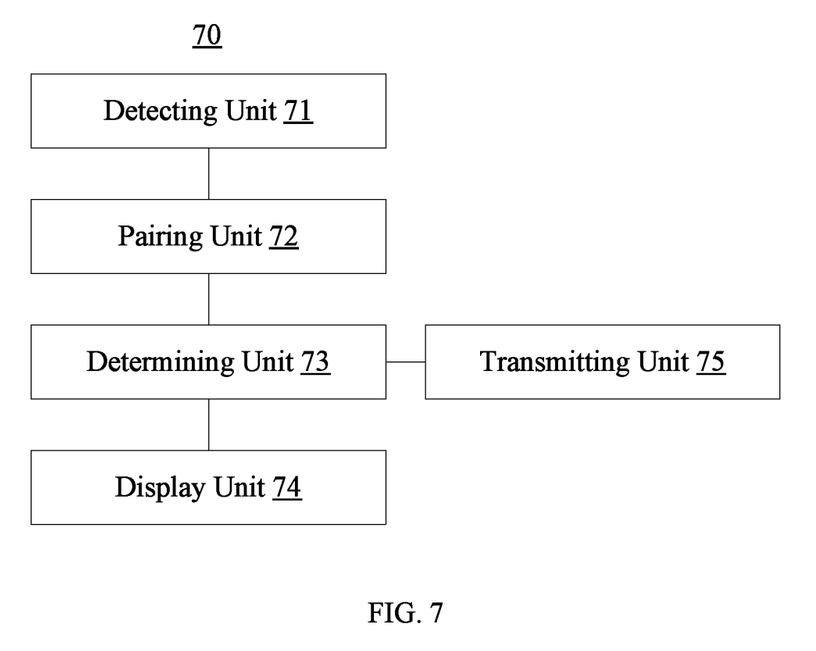
FIG. 7 is a structural diagram of another example of an information displaying device consistent with embodiments of the disclosure.

FIG. 7 is a structural diagram of another example of an electronic device 70 consistent with embodiments of the disclosure. The electronic device 70 can be an example of the first electronic device described above. As shown in FIG. 7, the electronic device 70 includes a detecting unit 71, a pairing unit 72, a determining unit 73, and a display unit 74. The detecting unit 71 detects whether the second electronic device is within a preset area around the electronic device 70. The pairing unit 72 pairs the electronic device 70 with the second electronic device if the second electronic device is within the preset area of the electronic device 70. The determining unit 73 determines a first display parameter of the electronic device 60 and a second display parameter of the second electronic device. The display unit 74 displays a first target content of the electronic device 70 according to the first display parameter. Further, the second electronic device can display the second target content of the second electronic device according to the second display parameter. The displayed first and second target contents do not cover each other.

In some embodiments, the detecting unit 71 further detects whether a wireless signal sent by the second electronic device is received. If the wireless signal sent by the second electronic device is received, the detecting unit 71 determines that the second electronic device is within the preset area of the first electronic device.

In some embodiments, the display unit 74 further display the first target content of the electronic device 70 according to a third display parameter after the electronic device 70 and the second electronic device are unpaired.

In some embodiments, the display unit 74 further display the first target content of the electronic device 70 in a first area. The second electronic device can display the second content of the second electronic device in a second area according to the second display parameter. The first and second areas do not overlap each other.

In some embodiments, as shown in FIG. 7, the electronic device 70 further includes a transmitting unit 75, also referred to as a "transmitter." After the first display parameter of the electronic device 70 and the second display parameter of the second electronic device are determined, the transmitting unit 75 sends the second display parameter to the second electronic device for the second electronic device to display the second target content of the second electronic device according to the second display parameter.

The functions of various units of the electronic device 70 are similar to the examples of information displaying method described above, and thus detailed description thereof is omitted.

Figure 8:
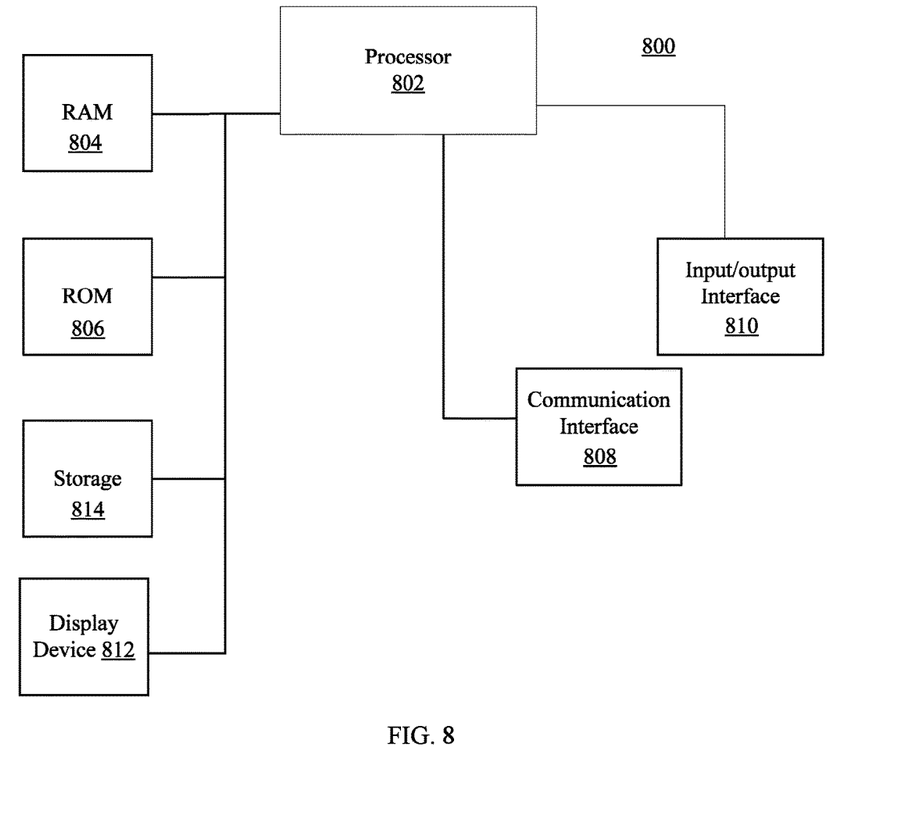
FIG. 8 is a structural diagram of another example of an information displaying device consistent with embodiments of the disclosure.

FIG. 8 is a structural diagram of another example of an electronic device 800 consistent with embodiments of the disclosure. The electronic device 800 may include one of a variety of information display devices, such as projector, a HUD, smart glasses, a personal computer, a mobile phone, a glass-type computing device, a tablet computer, or a notebook computer, or any portable, pocket-sized, handheld, head-mounted, wearable, computer built-in, or vehicle mounted mobile device.

As shown in FIG. 8, the electronic device 800 includes a processor 802, a random access memory (RAM) 804, a read only memory (ROM) 806, a communication interface 808, an input/output interface 810, a display device 812, and a storage 814. Any one or a combination of two or more of the RAM 804, the ROM 806, and the storage 814 can constitute a non-transitory computer-readable storage medium storing instructions that, when executed by the processor 802, cause the processor 802 to execute a method consistent with the disclosure, such as one of the above-described examples of the information displaying method. Other components may be added and certain components may be removed without departing from the principles of the disclosed embodiments.

The processor 802 may include, for example, a CPU, a graphic processing unit (GPU), a general purpose microprocessor, a DSP, a microcontroller, or an application specific integrated circuit (ASIC). The processor 802 may execute sequences of computer program instructions to perform various processes associated with the electronic device 800, including a method consistent with the disclosure, such as one of the above-described examples of information displaying method. The computer program instructions may be loaded into the RAM 804 for execution by the processor 802 from the ROM 806.

The communication interface 808 may provide communication connections such that the electronic device 800 can be accessed remotely and/or communicate with other systems through computer networks or other communication networks via various communication protocols, such as transmission control protocol/internet protocol (TCP/IP), hypertext transfer protocol (HTTP), etc.

The input/output interface 810 may be provided for users to input information into the electronic device 800 or for the users to receive information from the electronic device 800. For example, the input/output interface 810 may include any appropriate input device, such as a remote control, a keyboard, a mouse, an electronic tablet, voice communication devices, or any other optical or wireless input devices. The input/output interface 810 may also include certain sensors, such as camera(s), eye-trackers, and other types of sensing components to input various user or environmental information to the electronic device 800 for analysis and processing.

The display device 812 may include any appropriate display screen, such as a liquid-crystal display, a light-emitting diode display, a touch panel, a transparent display, or a projector. The display device 812 may be used to display the target content. The storage 814 may include any appropriate type of storage medium, such as a CD-ROM, a hard disk, a flash drive, an optical storage, a DVD drive, or other type of storage devices. During operation of the electronic device 800, the processor 802 may perform certain information processing processes.

Any two or more of the technical solutions described in the disclosure can be combined as long as they do not conflict with each other.

The disclosed devices and methods can be implemented in other manners. The above-described devices are merely examples. For example, different units may be defined merely according to their logical functions and can be defined according to a different manner. For example, multiple units or components can be combined or integrated into another system, or some features can be omitted or not executed. Further, the coupling, direct coupling, or communication connection between various components can be implemented by interfaces. The indirect coupling or communication connection between various devices or units can be electrical, mechanical, or another form.

Units described as separate components may or may not be physically separated from each other. A component described or shown as a unit may or may not be a physical unit. The units can be located in a same place or distributed on multiple network units. Some or all of the units can be chosen to realize purpose of the disclosure according to actual need. In some embodiments, each of the above-described units can include a device configured to perform a corresponding function.

Further, various functional units can be all integrated in one processing unit or be separate, individual units. Two or more units can be integrated in one unit. A unit can be implemented by hardware or by a combination of hardware and software.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method comprising:
   detecting, using one or more processors, whether a coordinated electronic device is within a preset area around a coordinating electronic device, both the coordinated electronic device and the coordination electronic device having an augmented reality (AR) function;
   pairing, in response to detecting that the coordinated electronic device is within the preset area, the coordinating electronic device with the coordinated electronic device;
   detecting, in response to successfully pairing the coordinating electronic device and the coordinated electronic device, whether a first portion of a first display device of the coordinating device observed by a user overlaps with a second portion of a second display device of the coordinated device observed by the user at a same time;
   determining, in response to detecting that the first portion of the first display device overlaps the second portion of the second display device, a first display parameter for displaying a first target content on the first display device of the coordinating electronic device according to a second display parameter for displaying a second target content on the second display device, at least a portion of the first target content including first virtual information superimposed in a real scene, and at least a portion of the second target content including second virtual information superimposed in the real scene; and
   controlling the first display device to display the first target content according to the first display parameter.

2. The method of claim 1, wherein:
the first display device includes a transparent screen; and
displaying the first target content according to the first display parameter includes displaying the first target content in a display area of the transparent screen according to the first display parameter.

3. The method of claim 1, wherein:
the first display device includes a projector; and
displaying the first target content according to the first display parameter includes projecting the first target content to a display area according to the first display parameter.

4. The method of claim 1, wherein:
the first display parameter and the second display parameter configure the coordinating electronic device and the coordinated electronic device to display the first target content and the second target content, respectively, without covering each other.

5. The method of claim 4, wherein:
the first display parameter configures the coordinating electronic device to display the first target content in a first area,
the second display parameter configures the coordinated electronic device to display the second target content in a second area, and
the first area and the second area do not overlap each other.

6. The method of claim 4, further comprising:
sending the second display parameter to the coordinated electronic device.

7. The method of claim 1, wherein detecting whether the coordinated electronic device is within the preset area includes:
detecting whether a wireless signal sent by the coordinated electronic device is received, and
determining, in response to receiving the wireless signal, that the coordinated electronic device is within the preset area.

8. The method of claim 1, further comprising:
unpairing the coordinating electronic device with the coordinated electronic device; and
displaying, after the coordinating electronic device and the coordinated electronic device are unpaired, the first target content according to another display parameter.

9. An electronic device having an augmented reality (AR) function comprising:
a processor;
a first display device coupled to the processor; and
a memory coupled to the processor and storing instructions to be executed by the processor to:
detect whether a coordinated electronic device is within a preset area around the electronic device, the coordinated electronic device having an AR function,
pair, in response to detecting that the coordinated electronic device is within the preset area, the electronic device with the coordinated electronic device,
detect, in response to successfully pairing the electronic device and the coordinated electronic device, whether a first portion of the first display device of the coordinating device observed by a user overlaps with a second portion of a second display device of the coordinated device observed by the user at a same time, and
determine, in response to detecting that the first portion of the first display device overlaps the second portion of the second display device, a first display parameter for displaying a first target content on the first display device of the electronic device according to a second display parameter for displaying a second target content on the second display device, at least a portion of the first target content including first virtual information superimposed in a real scene, and at least a portion of the second target content including second virtual information superimposed in the real scene;
wherein the first display device displays a first target content according to the first display parameter.

10. The electronic device of claim 9, wherein the first display device includes a transparent screen and displays the first target content in a display area of the transparent screen according to the first display parameter.

11. The electronic device of claim 9, wherein the first display device includes a projector and projects the first target content to a display area according to the first display parameter.

12. The electronic device of claim 9, wherein:
the first display parameter and the second display parameter configure the electronic device and the coordinated electronic device to display the first target content and the second target content, respectively, without covering each other.

13. The electronic device of claim 12, wherein:
the first display parameter configures the electronic device to display the first target content in a first area,
the second display parameter configures the coordinated electronic device to display the second target content in a second area, and
the first area and the second area do not overlap each other.

14. The electronic device of claim 12, further comprising:
a transmitter coupled to the processor, wherein the transmitter sends the second display parameter to the coordinated electronic device.

15. The electronic device of claim 9, wherein the memory further stores instructions to be executed by the processor to:
detect whether a wireless signal sent by the coordinated electronic device is received, and
determine, in response to receiving the wireless signal, that the coordinated electronic device is within the preset area.

16. The electronic device of claim 9, wherein:
the memory further stores instructions to be executed by the processor to unpair the electronic device with the coordinated electronic device, and
the first display device further displays the first target content according to another display parameter after the electronic device and the coordinated electronic device are unpaired.

* * * * *